United States Patent [19]
Fehlmann

[11] Patent Number: 5,868,830
[45] Date of Patent: Feb. 9, 1999

[54] BUILDING MATERIAL HAVING LOW DEGREES OF SHRINKAGE

[76] Inventor: Hans Beat Fehlmann, Zugerstrasse 76, CH 6318, Walchwil, Switzerland

[21] Appl. No.: 860,836

[22] PCT Filed: Nov. 27, 1995

[86] PCT No.: PCT/CH95/00277

§ 371 Date: Jul. 7, 1997

§ 102(e) Date: Jul. 7, 1997

[87] PCT Pub. No.: WO96/19418

PCT Pub. Date: Jun. 27, 1996

[30] Foreign Application Priority Data

Dec. 21, 1994 [CH] Switzerland ............................ 3871/94

[51] Int. Cl.$^6$ .................................................... C04B 38/00
[52] U.S. Cl. ........................ 106/672; 106/677; 106/681; 106/724; 106/737; 106/738; 106/816; 106/817; 106/802; 106/792; 106/795; 106/122
[58] Field of Search ..................... 106/672, 677, 106/724, 737, 738, 792, 795, 816, 817, 819, 823, 122, 681, 802, 688

[56] References Cited

U.S. PATENT DOCUMENTS

| | | | |
|---|---|---|---|
| 4,985,080 | 1/1991 | Jung | 106/724 |
| 5,326,396 | 7/1994 | Abdelrazig et al. | 106/823 |
| 5,584,926 | 12/1996 | Borgholm et al. | 106/724 |
| 5,641,815 | 6/1997 | Fehlmann | 106/672 |

*Primary Examiner*—Michael Marcheschi
*Attorney, Agent, or Firm*—Notaro & Michalos P.C.

[57] ABSTRACT

A building and construction material and method of making the material utilizes water with cement which are mixed together and followed by mixing with a mineral filler material such as sand or gravel to produce concrete having micropores of about 0.01 to about $5\mu$ in diameter. By eliminating from the mineral filler material all fine grains of less than 0.2 mm, it has been found that the strength of the concrete is improved and the amount of shrinkage is reduced.

13 Claims, No Drawings

– 1 –

BUILDING MATERIAL HAVING LOW DEGREES OF SHRINKAGE

This is a 371 application of International Application Number PCT/CH95/00277 filed Nov. 27, 1995.

FIELD AND BACKGROUND OF THE INVENTION

The present invention relates to a building and construction material consisting substantially of binding agents such as cement, and mineral filler materials, a method of producing the building and construction material and a method of reducing the degree of shrinkage in the building and construction material.

The present invention is a further development of European Patent Application EP 0 647 603 which is equivalent to U.S. Pat. No. 5,641,815 and in which a construction and building material, such as concrete is disclosed which includes uniformly dispersed micropores. These superfine pores have a diameter in the range of about $0.01\mu$ to about $5\mu$, whereby the individual pores are themselves closed.

In this way, it is possible to build structures and building parts with a substantial higher strength in comparison with common concrete. The pores include an amount of air which is conventionally included in concrete for anti-freezing effect but the concrete is stronger than conventional concrete.

The micropores are obtained by mixing the binding agent or reactive material, such as cement, with additives, such as tensides and water in a conventional mixer or in a high turbulence mixer, in order to be thereafter or directly mixed in one processing step in a conventional concrete mixer with the aggregate such as sand and gravel. In case no additives are used, a high turbulence mixer must be used. In case additives such as tensides are used, the mixing of the cement with water can proceed in a conventional mixer.

The inclusion of micropores finds specific application for the production of so called lightweight building materials, such as those containing lightweight filler materials, in that due to the increase of the strength of the concrete enclosing the filler materials, the finally resulting lightweight building material has a sufficient strength.

SUMMARY OF THE INVENTION

The object of the present invention is to provide building and construction materials in form of heavy building materials, such as heavy concrete or conventional concrete, including a reactive binding agent and mineral filler materials, with an increased strength and a small shrinkage.

According to the invention the building and construction material including a binding agent such as a reactive binding agent, includes filler materials such as preferably mineral filler materials which have no finest grain components <0.2 mm. By means of deleting these fine grain components it impossible to obtain degrees of shrinkage in the range of about 0.1–0.3 per mille. Such a small degree of shrinkage is desired in the technique of high stressed concrete (bridges, roofs, very elegant, slender structures, etc.) where high strength is needed without shrinkage cracks due to shrinking which would endanger the structure.

A great number of publications are known which represent precisely the opposite opinion. It is conventionally suggested to use concrete having high portions of powdery grains in order to obtain as small as possible degrees of shrinkage whereby an increased portion of fine grains and powdery grains is not judged to be detrimental. The climate to which the concrete is exposed to, and in exceptional cases the composition of the cement are mentioned as triggering influencing properties for the shrinkage of cementitious blocks, mortar and concrete. Keeping the concrete moist is also important.

Due to this prior art, it is surprising that a substantial reduction of the shrinkage can be obtained by reduction of the finest grain components in the filler material or aggregates, in the concrete. As already mentioned, it is required in accordance with the invention to remove at least fine and powdery grain components from the aggregate which have a diameter of <0.2 mm. It can, however, be also advantageous to even remove finest component portions of <0.5 or even > up to 1.0 mm from the aggregate. By means of this the degree of shrinkage can be reduced, as a rule, from 0.5–1 per mille in conventional concrete to the above mentioned 0.1–0.3 per mille.

The use of aggregates without fine components suggested in accordance with the invention lends itself, excellently to be combined with the teaching of EP 0 647 603, according to which additionally micropores are to be foreseen in the building and construction material according to the invention. Microporous concrete features as generally known the property that the strength of the concrete structure becomes substantially higher due to the microporosity, i.e. the bending strength and the compressive strength rise by a multiple factor compared with a nonporous mass of cement. The air inclusions also reduce the specific gravity of the concrete which is a further advantageous property of microporous concrete. Thus, it has been determined that the use of a water/cement mixture containing possibly additives such as tensides, having microporous inclusions and mixed with aggregates such as sand and gravel leads, when also deleting fine grains (powdery grains and grains up to 0.5 mm, or even for certain kinds, up to 1 mm) to higher strengths and also a considerably lower degree of shrinkage than by conventional methods hitherto used. By an addition of sand and gravel for high quality heavy and standard concrete (specific gravity about 2.3 –2.5), degrees of shrinkage of about 0.1–0.3 per mille by an addition of microporous cement slime are obtained, and specifically without any addition of silicate powder or other products. It must, however, be additionally stated that keeping the concrete moist results now as before in still better results relative to the degree of shrinkage.

The microporosity which is obtained for instance by a mixing of cement grout in a high turbulence mixer or by use of special-additives, specifically tensides, causes very good improvements to the quality of the concrete with regard to strength, degree of shrinkage, frost resistance, chemical resistance and also price. Since the cement grout is filled by air by a volume of about 4–7% of the total concrete volume, this porosity acts like ball bearings, i.e. the processing property is considerably better. The measure of spreading can be held high while maintaining low water/cement factors. Additionally, due to the superfine porosity, no cement slime is adhered to the powder grain surface which in proportion is very high.

By deleting the finest component in the aggregate, the surface of the aggregate is considerably reduced so that the aggregates are at least substantially completely enclosed or encapsulated by the cement. In this way, the cement forms a practically completely coherent matrix structure with high strength but including the micropores. By the invention a fine gravel e.g. of 0.5–8 mm or 0.5–6 mm can be used without individual gravel bodies contacting each other, so that they float in the cement slime. Thus, very good properties are arrived at in the concrete. The microporosity in heavy concrete allows the invention to be used where quality concrete building tunnels or when mill cutting. This is because the grain is relatively small, by means of which according to previous concrete theories, no sensible concrete can be produced.

DESCRIPTION OF THE PREFERRED EMBODIMENTS

The invention will now be explained by example.

1. Production of "cement grout" including micropores.

2 kg cement were mixed with 0.6 l water in a high turbulence mixer at about 1500 revolutions per minute to form hydrate cement and finally testing specimens were produced. The average compression strength ascertained at the testing specimens amounted to 74.1 N/mm$^2$. In comparison the average compression strength at a concrete testing body without encapsulated micropores amounts to about 20–25 N/mm$^2$.

A further mixture of 2 kg cement and 0.5 l water and the addition of 0.04 kg of a tenside additive, as well, as mixed in a conventional mixer and thereafter formed bodies were produced. An average compression strength of 75.0 N/mm$^2$ thereof could be measured. Because as a rule the average compression strength increases after aging still by about 25%, a final strength of more than 100 N/mm$^2$ may thus be expected.

The present examples illustrate that by an incorporating of micropores, produced mechanically or chemically, the compression strength can be increased by a factor of about 3–4. It has thereby been proven, furthermore, that specifically a low water/cement factor such as in the case of the last example of 0.225, leads to a further increase of the compression strength. The water/cement factor has, however, no substantial influence on the degree of shrinkage.

2. Measuring of the degree of shrinkage 13 kg of cement were mixed with 5 l water in a high turbulence mixer at 1500 revolutions per minute. Thereafter, the cement grout was mixed in a conventional mixer with 40 kg sand 0.5–4 mm and 40 kg gravel 4–8 mm and processed at temperatures in the range of 15°–20° C.

The degree of shrinkage measured at the completely solidified formed body was pronouncedly below 0.2 per mille.

A further mixture of also 13 kg cement and 5 l water and 0.3 kg of a tenside additive, as well, were mixed in a conventional mixer, whereby thereafter the same amounts of aggregates as mentioned above were added to the mixture. The in this way produced concrete was again molded and again degrees of shrinkage of clearly below 0.2 per mille were measured at the solidified formed bodies.

It is thus clearly proven that by the combination of enclosing the micropores and by the use of aggregates without any fine components, the strength of the concrete can be increased substantially and the degree of shrinkage can be substantially decreased. The reduction of the degree of shrinkage is thereby obtained completely, without the addition of silicate powder and other products. Moreover, reference is made to U.S. Pat. No. 5,641,815 (equivalent to Swiss CH 3046/93-1).

In accordance with the present invention, the mineral filler material has no grains less than 0.2 mm and in particular no grains less than 0.3 mm or in a still further preferred embodiment, no grains less than 0.5 mm or even no grains less than 0.8 or 1 mm.

I claim:

1. A building and construction material comprising: hydrate cement and a mineral filler material, the hydrate cement and filler material including a substantially uniform distribution of micropores each with a diameter of about 0.01$\mu$ to about 5$\mu$, said pores being closed and the mineral filler material being substantially free of fine grains of less than 0.2 mm.

2. A building and construction material according to claim 1, wherein the filler material is substantially free of grains of less than 0.5 mm.

3. A building and construction material according to claim 1 wherein the mineral filler material is substantially free of grains of less than 1 mm.

4. A building and construction material according to claim 1 wherein the mineral filler material consists essentially of at least one of sand or gravel.

5. A building and construction material according to claim 4 further comprising lime.

6. A method of producing a building and construction material comprising:

removing from a mineral filler material, fine grains having a diameter of less than 0.2 mm;

mixing water with cement in a high turbulence mixture to produce a hydrate cement having micropores therein; and thereafter mixing the hydrate cement having micropores with the mineral filler material which is free of fine grains having a diameter of less than 0.2 mm to produce the material which includes a substantially uniform distribution of micropores each having a diameter of about 0.01$\mu$ to about 5$\mu$.

7. A method according to claim 6 further comprising adding at least one tenside to the hydrate cement, and wherein the mineral filler material is selected from the group consisting of gravel and sand.

8. A method according to claim 6 wherein the hydrate cement has a water to cement ratio of about 0.22 to about 0.4.

9. A method according to claim 8 wherein the water to cement ratio is about 0.25 to about 0.31.

10. A method according to claim 8 further comprising adding lime to the hydrate cement.

11. A method according to claim 6 further comprising removing fine grains having a diameter of less than 0.8 mm from the mineral filler material.

12. A method according to claim 6 further comprising adding lime and at least one tenside to the hydrate cement and filler mixture.

13. A binding and construction material consisting essentially of:

hydrate cement, at least one tenside, lime, a mineral filler material which is free of fine grains of less than 0.2 mm diameter; and water; wherein the water is mixed with the cement, tenside, lime and filler material in a manner to produce a substantially uniform distribution of micropores with a diameter of about 0.01 to about 5$\mu$ therein.

* * * * *